United States Patent [19]

Weiss

[11] Patent Number: 4,887,229

[45] Date of Patent: Dec. 12, 1989

[54] METHOD AND APPARATUS FOR A NON-CONTACT MEASURING OF A TEMPERATURE OF A BODY

[75] Inventor: Hardy P. Weiss, Hütter, Switzerland

[73] Assignee: Martin Lehmann, Wohlan, Switzerland

[21] Appl. No.: 64,464

[22] Filed: Jun. 22, 1987

[30] Foreign Application Priority Data

Jun. 20, 1986 [CH] Switzerland .................. 2503/86

[51] Int. Cl.$^4$ ............................. G01J 5/24; G01J 5/62
[52] U.S. Cl. .................................. 364/557; 250/352; 374/124; 374/128; 374/133
[58] Field of Search ............... 374/132, 133, 129, 170, 374/128; 250/352; 364/571, 571.03, 557

[56] References Cited

U.S. PATENT DOCUMENTS

| 3,057,200 | 10/1962 | Wood | 374/132 X |
|---|---|---|---|
| 3,293,915 | 12/1966 | Banca et al. | 374/133 X |
| 4,070,900 | 1/1978 | Engels | 364/571.03 X |
| 4,109,508 | 8/1978 | Fukuyama | 374/124 X |
| 4,435,093 | 3/1984 | Krause et al. | 374/141 X |
| 4,527,896 | 7/1985 | Irani et al. | 374/133 X |
| 4,634,294 | 1/1987 | Christol et al. | 374/129 X |
| 4,741,626 | 5/1988 | Hashimoto | 374/133 |
| 4,797,840 | 1/1989 | Fraden | 364/557 |

FOREIGN PATENT DOCUMENTS

| 2306449 | 8/1973 | Fed. Rep. of Germany | 374/133 |
|---|---|---|---|
| 1226540 | 3/1971 | United Kingdom | 374/133 |

OTHER PUBLICATIONS

EPO Application Publication No. 0,098,402, 1/18/84, "Temperature Measuring Apparatus", Noda Tomimitsu, 19 pages.

Primary Examiner—Daniel M. Yasich
Attorney, Agent, or Firm—Antonelli, Terry & Wands

[57] ABSTRACT

A method and apparatus for measuring a temperature of a body extensively independently of an interference radiation. The apparatus comprising a sensor wherein a radiation of the body is chopped or interrupted by a chopper disposed between the sensor and a body. In order to sense extraneous radiation which originates predominately from losses at the sensor as well as from frictional heat of the chopper, the housing temperature of the sensor is detected for correction purposes on a side of the chopper facing the sensor by an additional sensor. Around and in the zone of the travel path of the chopper, an additional sensor is provided for sensing an ambient temperature of the chopper.

27 Claims, 4 Drawing Sheets

METHOD AND APPARATUS FOR A NON-CONTACT MEASURING OF A TEMPERATURE OF A BODY

BACKGROUND OF THE INVENTION:

The present invention relates to a method and apparatus for a non-contact measurement of a temperature of a body.

In non-contact measuring of a temperature originating from heat radiation of a body, which is not the same as body temperature, since the body need not be thermally equalized, a problem arises in that an ambient radiation can drastically falsify a result of the measurement. The problem, actually a problem of signal-to-noise ratio, becomes even more critical if temperatures to be measured lie only slightly above or below an ambient temperature, such as within several 100° C.

In order to avoid the above noted problem, according to advantageous features of the present invention, a chopper means is provided for chopping or interrupting the heat radiation between the body and a temperature sensor, and at least one ambient temperature of a sensor on the side of the chopper means facing the sensor is taken into account in evaluating the temperature detected by the sensor.

By virtue of the fact that the heat radiation between the body and the temperature sensor provided is chopped up or interrupted, heat radiation pulses detected by the sensor are produced, an amplitude of which is provided by two heat radiation components, namely, by ambient radiation on the sensor side of the chopper means and by heat radiation on the side of the chopper means facing away from the sensor, which latter heat radiation is composed of the ambient irradiation at that location and radiation of the body the temperature of which is to be detected.

While the ambient radiation on the side of the chopper means facing away from the sensor cannot be separated from the body radiation but can be reduced to an insignificant amount by, for example, a selected minimum distance between the chopper means and the body, and is practically time-invariant, the ambient radiation on the sensor side of the chopper means presents a more serious problem, especially when considering its change in time as it occurs after actuation of the sensor and chopper means, due to the electrical feeds as well as, generally, by the output of the chopper means and the fact that the mounting elements for the sensor and chopper means define relatively small-volume spaces wherein temperature fluctuations result despite a stable larger-space temperature.

Due to the fact that at least one ambient temperature of the sensor on a side of the chopper means facing the sensor is considered or taken into account in the evaluation process, it is possible to effect a temperature measurement which represents solely the temperature for the body radiation even before the partial system on the sensor side of the chopper means has become thermally stabilized which may take, in dependence upon the structure, relatively long periods of time and independent of the temperature where the partial system finally stabilizes on.

Commercially available temperature sensors for non-contact measurement of heat radiation have been proposed with the sensor being disposed in a housing and constructed as finished components, usually, with an integrated amplifier. In this connection, the present invention further proposes to utilize as the one ambient temperature, a temperature of the sensor housing.

As can readily be appreciated, a heat radiation of the sensor housing directly affects the actual sensor which, for example, may be constructed as a semi-conductor chip and integrated into the housing.

A further source of heat radiation which should be considered is the chopper means. Due to the work performed by the chopper means, especially since it is a mechanically operated chopper means, it acts in the surrounding air as a Joule's brake. In this connection, in accordance with the present invention, it is further proposed to take into account, as one ambient temperature, the temperature caused by the work performed by the chopper means.

In accordance with further features of the present invention, the temperature of the sensor housing is feedback-controlled so that it is at a predetermined value and this approach can optionally also be done with regard to the temperature rise resulting from the work of the chopper means.

If the heat radiation is chopped or interrupted by a mechanically moved chopper means, such as, for example, a disc with radiation-impermeable and radiation-permeable segments, it is also possible in accordance with the present invention, to provide a sensor for sensing a temperature in a region of the travel path of the chopper means as an ambient temperature.

While the temperature can be predetermined by appropriate regulation or control means, due to the bulk of the mechanical chopper means, such a regulation for maintaining temperature equalization over the entire area at the chopper means will be relatively sluggish or slow. For this reason, in accordance with the present invention, it is proposed that the temperature measured by means of the sensor is corrected as a function of the temperature produced by the chopper means.

Preferably, in accordance with the present invention, a first signal, dependent upon the temperature produced by the work of the chopper means, is multiplied by a first coefficient and then the product is added to a second coefficient in order to obtain a second signal. A third signal, dependent upon the temperature detected by the sensor by the second signal is divided in order to obtain a fourth signal, and the fourth signal is added to the first signal in order to obtain a signal representative of a body temperature or body radiation.

Advantageously, the sensor output signal, prior to being further evaluated, is averaged over several chopper periods of operation of the chopper means in order to eliminate incidental fluctuations of the sensor output signal.

The above noted coefficients for correcting the sensor output signal, based on the temperature produced by the work of the chopper means, are preferably determined experimentally from at least two measurements, at predetermined body temperatures and respectively two values of the temperature produced by the work of the chopper means and supplied to a memory means.

As noted above, one can only consider representative body temperature if the body has been thermally equalized. On the other hand, temperature measurement of a body that has not been thermally equalized represents only the thermal energy content of a body volume element lying directly within the region of the measurement.

With the use of such temperature measurement, in order to obtain, in the case of relatively large bodies an indication of the thermal energy content of a maximally large volume element of the body, it is proposed in accordance with the present invention that the temperature measurement be conducted by a sensor in the zone of an already existing recess at the body or a recess that has been provided for this purpose in order to increase or enlarge a body volume element for the thermal energy content of which the temperature measurement is representative.

In accordance with the present invention, the recess may, for example, be an opening of a can or container to be measured as a body or, with bodies not provided with a recess, such as, for example, metal ingots, the recess may be provided such as in the form of, for example, a bore. In this manner, the above noted temperature measurement becomes representative for the thermal energy content of a substantially larger body volume element since the provided recess acts similarly to a structure exhibiting black body radiation, and emits a heat radiation corresponding to the heat content averaged over a relatively large adjoining volume.

If, for example, the body is moved relative to the sensor such as, for example, on a production line, in accordance with the present invention, a period of operation of the chopper means is selected to be shorter than the time span during which the geometric recess lies within the sensor measuring range so that, during such measuring period, an adequate number of measuring samples are available so as to enable averaging thereby eliminating random variables.

According to the present invention, an apparatus or arrangement for non-contact measurement of a temperature of a body is provided which includes a first temperature sensor means, a heat radiation chopper means connected in front of the heat input of the sensor means, and at least one further temperature sensor means disposed at least chopper means and adjacent the first temperature sensor means, and on the side of the first sensor with respect to the chopper means.

Preferably, according to the present invention, first temperature sensor or a further temperature sensor is thermally tightly coupled with a housing of at least one of the first temperature sensor and the chopper means. It is further proposed in accordance with the present invention to connect at least one additional temperature sensor as a pick up for a controlled variable into a temperature feedback control circuit for the temperature of a zone or area wherein the pick up is located.

To provide for a simple construction of the arrangement or apparatus of the present invention, it is proposed to use a mechanically moved chopper means such as, for example, a chopper disc, provided with a plurality of segments impermeable to heat radiation and segments permeable to heat radiation, with the temperature sensor or, respectively, a further temperature sensor, being arranged directly adjacent the path of movement of the chopper.

It has been determined that, especially when providing a mechanical chopper means, relatively large time periods of from one hour to several hours may elapse due to the frictional work to the surrounding air until the air, ambient in the chopper means and thus the heat radiation transmitted from the zone of the chopper means to the first sensor means, has reached a stable value.

Since it is extremely important in many applications to be able to perform representative measurements directly after connecting the arrangement or apparatus to power, the provision of an additional temperature sensor means as proposed by the present invention adjacent the travel path of the chopper means is extremely advantageous because, by correspondingly considering the time-variable temperature detected by the additional temperature sensor means for a measured result, it becomes inventively possible to effect a representative measurement as soon as immediately after the connection of the apparatus or arrangement to power.

Although, as noted above, the time variable behavior of the heat radiation may be eliminated by the provision of one or more feedback control circuits, as can readily be appreciated, the total overall expense for such an arrangement is relatively high particularly when considering that it is necessary to include, as temperature-adjusting members, heating and/or cooling elements such as Peltier elements and, as noted above, such control circuits have a relatively slow response time or are sluggish.

Provision of a feedback-control circuit may be basically eliminated by providing an evaluating unit such as, for example, a data processing unit for receiving the outputs of at least some of the temperature sensors and generating and transmitting at an output side an output signal representative of the body temperature.

Preferably, in accordance with the present invention, such an evaluating unit for the performance of calculations on the output signal of the additional temperature sensor disposed in a zone of the chopper means with an output signal of the first temperature signal for the body temperature may include a multiplication unit connected at on input to an input for the further temperature sensor at the evaluating unit, with a signal of an adjustable value being fed to the second input of the multiplication unit. The output of the multiplication unit may be fed to a summation unit, with an adjustable signal value being fed to the second input of such unit. The output of the first temperature sensor may be transmitted at the evaluating unit to a numerator input of a dividing unit, the denominator input of which is fed with the output signal of the summation unit. The output of the dividing unit as well as the output of the further temperature sensor may be transmitted to a further summation unit the output of which is connected to the output of the evaluation unit.

Additionally, in accordance with the present invention, storage elements may be provided for storing the signals of the adjustable values, with the storage elements being connected to second input of the multiplication unit and to the summation unit connected thereafter. In situations wherein, as noted above, a recess is provided in a body to be measured, and the body is moved relative to the temperature sensor, in accordance with the present invention, it is necessary to take into account certain criteria indicating when a temperature measurement with respect to the moving body takes place at a correct location, that is, in a region of the recess and also to provide an indication as to when the temperature measurement should not take place inasmuch as the recess is not located in a predetermined position. Preferably, this difficulty is solved by connecting, after the first sensor, a threshold-value-sensitive unit the output of which operatively connecting the output of the first sensor with the output of the arrangement or apparatus if the value of the sensor output signal lies above or below a predetermined value according to the threshold value.

Since, in a body provided with a recess such as described hereinabove, only its surface radiation is effective for measurement, as long as the recess is not located or disposed in the measuring range of the sensor and there is a sudden change once the recess enters the measuring range, the above noted threshold-value-sensitive unit makes it possible to detect the point in time when the aforementioned recess lies within the measuring range of the sensor.

Preferably, in accordance with the present invention, the sensor and threshold-value-sensitive unit are constructed so that a response is obtained to a predetermined change in the temperature or, respectively, radiation per unit of time, detected by the first sensor. Thus, changes in radiation and/or flanks trigger the measurement independently of the prevailing temperature levels.

The above and other objects, features, and advantages of the present invention will become more apparent from the following description when taken in connection with the accompanying drawings.

BRIEF DESCRIPTION OF THE DRAWINGS:

FIG. 3 is a schematic illustration of an arrangement of a temperature sensor for non-contact measurement of a temperature of a body in a zone or area of the sensor-chopper means to be thermally controlled in accordance with the arrangement of FIG. 2a;

Figure 1:
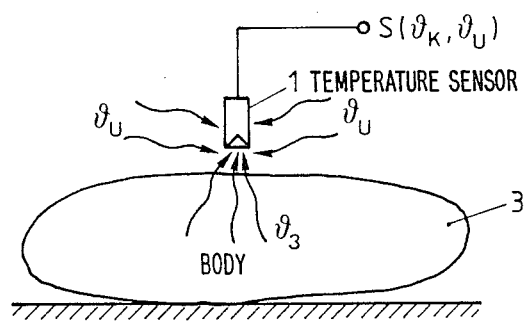
FIG. 1 is a schematic view of an arrangement of a temperature sensor for non-contact measurement of the temperature of a body depicting effects of ambient radiation.

DETAILED DESCRIPTION:

Referring now to the drawings wherein like reference numerals are used throughout the various views to designate like parts and, more particularly, to FIG. 1, according to this figure, a temperature measuring sensor 1 such as, for example, a pyroelectric detector is arranged so as not to contact a zone or area of a body 3. The temperature measuring sensor 1 is adapted to act as a thermally electrical transducer and transmit a signal S on an output side thereof, as a function of a temperature of the body 3 or radiation $\theta_3$ as well as the ambient radiation corresponding to $\theta_U$. If the radiation of the body 3 is not substantially different from the ambient radiation, in that its temperature is, for example, below 100° C., with an ambient temperature of 20° C., then the ambient radiation unduly affects measuring accuracy. This is particularly true if the ambient radiation for reasons described more fully hereinbelow, is not constant but rather varies with time.

Figure 2A:
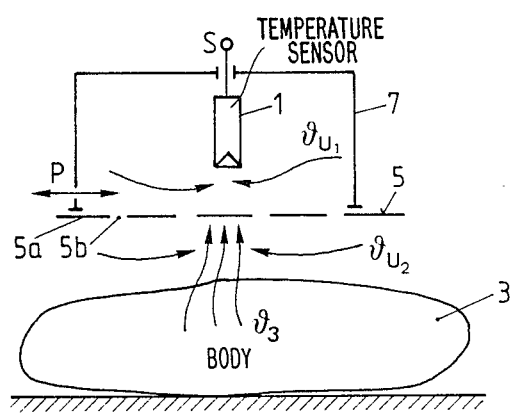
FIG. 2a is a schematic representation of the arrangement of FIG. 1 during a chopping or interruption of heat radiation between a body and a temperature sensor.

As shown in FIG. 2a, a heat radiation chopper means 5 is, according to the present invention, disposed between the body 3 to be measured having a radiation corresponding to $\theta_3$, and the temperature measuring sensor 1. The chopper means is, for example, a mechanical chopper means including segments 5a, 5b which respectively represent segments impermeable to heat radiation and segments permeable to heat radiation, with the segments being alternatingly moved between the temperature measuring sensor 1 and the body 3 in the direction of the arrow P. The ambient radiation with respect to the chopper means 5, on a side forward the temperature measuring sensor 1 is represented by the character $\theta_{U1}$, with the ambient radiation with respect to the chopper means 5, forward of the body 3, being denoted by the reference character $\theta_{U2}$.

Figure 2B:
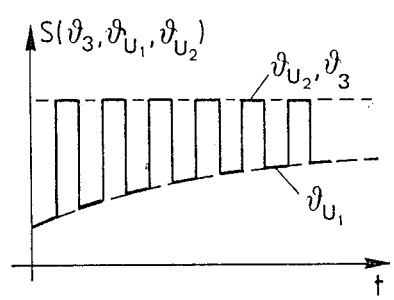
FIG. 2b is a graphical illustration quantitatively illustrating sensor output signal resulting from an arrangement of FIG. 2a in dependence upon the various radiations.
Figure 3:
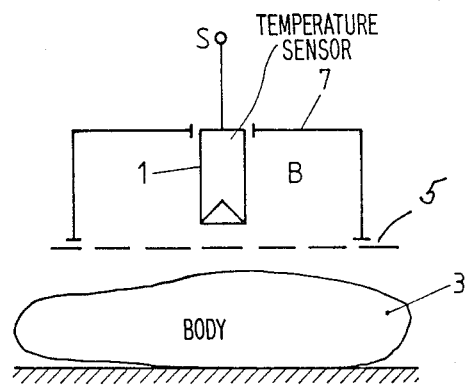

FIG. 2b illustrates a qualitative output signal of the temperature measuring sensor 1. If radiation between the body 3 and the temperature measuring sensor 1 is interrupted by a segment 5a of the chopper means 5, then the radiation level detected by the temperature measuring sensor 1 corresponds to the lower curve $\theta_{U1}$ corresponding to a radiation of $\theta_{U1}$, illustrated in FIG. 2b. If the radiation between the body and the temperature measuring sensor 1 is unimpeded because of a segment 5b, then the detected radiation corresponds to a value resulting from the ambient radiation corresponding to $\theta_{U2}$ and the body radiation $\theta_{U3}$. While the ambient radiation $\theta_{U2}$ on the body side can be reduced by positioning the chopper means 5 as closely as possible to the body 3, the ambient radiation $\theta_{U1}$ on the side of the temperature measuring sensor 1 causes substantially more problems in controlling the same. Generally, an arrangement, as schematically illustrated in FIG. 2a is accommodated in a schematically illustrated housing 7 in such a manner that, when such arrangement is placed into operation, relatively long periods of time may elapse until the interior of the housing 7, which is generally poorly ventilated, stabilize the radiation corresponding to $\theta_{U1}$. This, as indicated in FIG. 2b leads to a time variable amplitude characteristic of the measuring temperature output signal S of the temperature measuring sensor 1, even if the radiation of the body 3 corresponding to $\theta_3$ is constant. While the ambient radiation corresponding to $\theta_{U2}$ may, in many instances, be assumed to be constant with adequate accuracy, this is not possible for the radiation corresponding to $\theta_{U1}$, especially during the thermal settling time and, consequently, a time period for the settling time may last several hours. For this reason, it is extremely important for an accurate temperature measurement to know or ascertain the conditions on the sensor side of the chopper means 5, to consider such conditions, or to affect such conditions so that, as illustrated in FIG. 3, constant radiation conditions prevail within the sensor-side zone B as defined or determined by the housing 7 or, if this is not the case, the most essential radiation contributions from the space are known and may be taken into account when evaluating the output signal S of the temperature measuring sensor 1.

Figure 4:
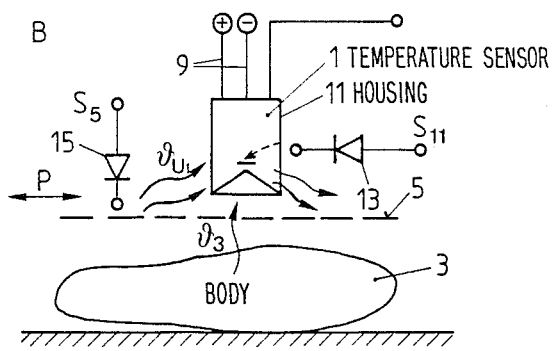
FIG. 4 is a schematic representation of a temperature sensor for non-contact measurement of a temperature of a body similar to FIG. 2a and of the provision of further temperature sensors at significant locations for controlling a temperature and, respectively, heat radiation conditions in a zone or area such as shown in FIG. 3.

There are primarily two sources of radiation responsible for the ambient radiation corresponding to the temperature $\theta_{U1}$ on the sensor side of the chopper 5. First, the temperature measuring sensor 1, with a conventionally integrated amplifier, customarily supplied, as shown in FIG. 4, by way of supply or feed cables 9 with electricity, and thus the housing 11, and, second, the chopper means 5, if a mechanical chopper means is involved as illustrated by the arrow P. While the housing of the integrated temperature measuring sensor 1 radiates toward the inside onto a pyrotechnical sensitive semiconductor element, the mechanical motion of the chopper means 5 produces a frictional heat in the ambient air which can lead, in a more or less closed relatively small-space system with mechanical mounting elements and a casing, analogous to the housing 7 of FIGS. 2a and 3, to result in a temperature rise of several degrees within the first few hours following an activation of the apparatus or arrangement.

Consequently, as shown in FIG. 4, according to the present invention, a first correctional temperature sensor 13 is closely thermally coupled with the housing 11 of the temperature measuring sensor 1, and an additional correctional temperature sensor 15 is coupled with the chopper means 5, in the case of a mechanical chopper means 5 so that the additional correctional temperature sensor 15 is located in an immediate vicinity of a path of motion of the chopper means 5 in such a manner that the additional correctional temperature sensor 15 measures the temperature of the ambient air of the chopper means 5.

The first correctional temperature sensor 13 and additional correctional temperature sensor 15 include, for example, thermal electric transducers which produce output signals $S_{11}$, $S_5$, representing the housing temperature and the ambient air temperature for the chopper means 5, respectively.

Figure 5:
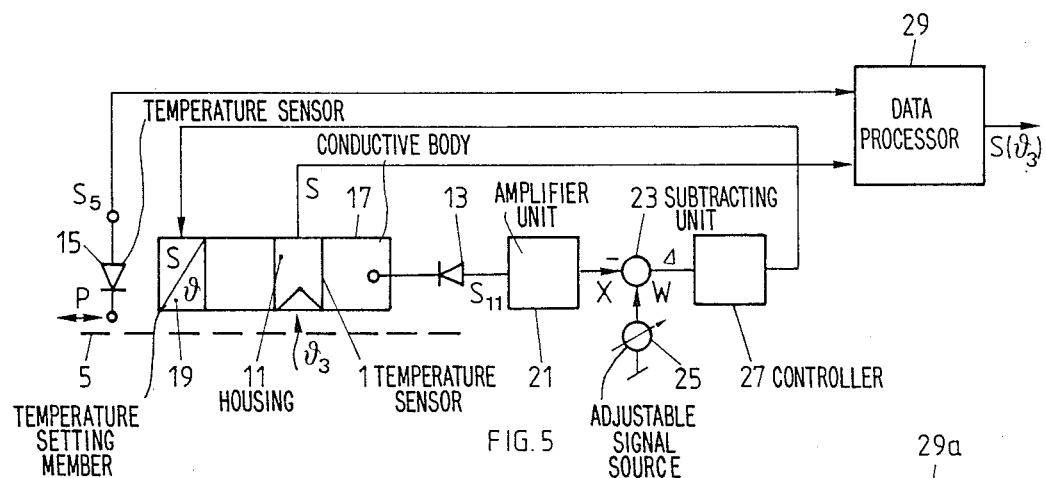
FIG. 5 is an arrangement according to FIG. 4 with a temperature control of a housing for the body radiation sensor, and with a correction of the measuring signal as a function of radiation produced by work of a chopper means.

FIG. 5 schematically illustrates a first version as to the manner by which signals of the temperature measuring sensor 1, the first correctional temperature sensor 13, and the additional correctional temperature sensor 15 are evaluated.

The temperature measuring sensor 1 is embedded, as schematically shown, in a relatively large-volume thermally well-conductive body 17 made, for example, of a metallic material to which is thermally closely coupled the first correctional temperature sensor 13 and a temperature setting member 19 such as, for example, a Peltier element. The output signal $S_{11}$ of the first correctional temperature sensor 13, dependent upon housing temperature of the housing 11, is optionally processed and amplified in a unit 21 and then introduced, as a control variable X into a differencing or subtracting unit 23. The differencing or subtracting unit 23 is fed, at a correcting variable input W, with an adjustable desired or governing value W, adjustable at an adjustable signal source 25 of conventional construction. A control differential signal $\Delta$ is introduced through a controller 27 to the temperature adjusting member such as a Peltier element so that the temperature of the conductive body 17 is set at a value corresponding to a desired value W controlled or set by the adjustable signal source 25. Consequently, the housing temperature of the housing 11 is constantly feedback controlled with respect to time and is known.

Due to a relatively low inertia of the housing 11 and conductive body 17 with respect to temperature fluctuations, the thermal stability of the housing 11 can be rapidly achieved so that, after activation of the illustrated arrangement, a relevant measurement can soon be conducted with regard to errors caused by thermal instabilities of the housing 11. Preferably, in accordance with the present invention, for reasons described more fully hereinbelow, the output signal $S_5$ of the additional correctional temperature sensor 15, detecting the change in temperature resulting from operation of the chopper means 5, is introduced together with the output signal S of the temperature measuring sensor 1 into an evaluating or data processing unit 29 at the output of which a signal S ($\theta_3$) appears which represents the radiation of the body 3 and is determined from a calculation of the measuring sensor output signal S and the output signal $S_5$ of the additional correctional temperature sensor 15. The controller 27 may be of the type disclosed, for example, in Elsevier's Dictionary of Computers Automatic Control and Data Processing or described on pages 670–681 in the German Handbook of Electrical Engineering.

Figure 6:
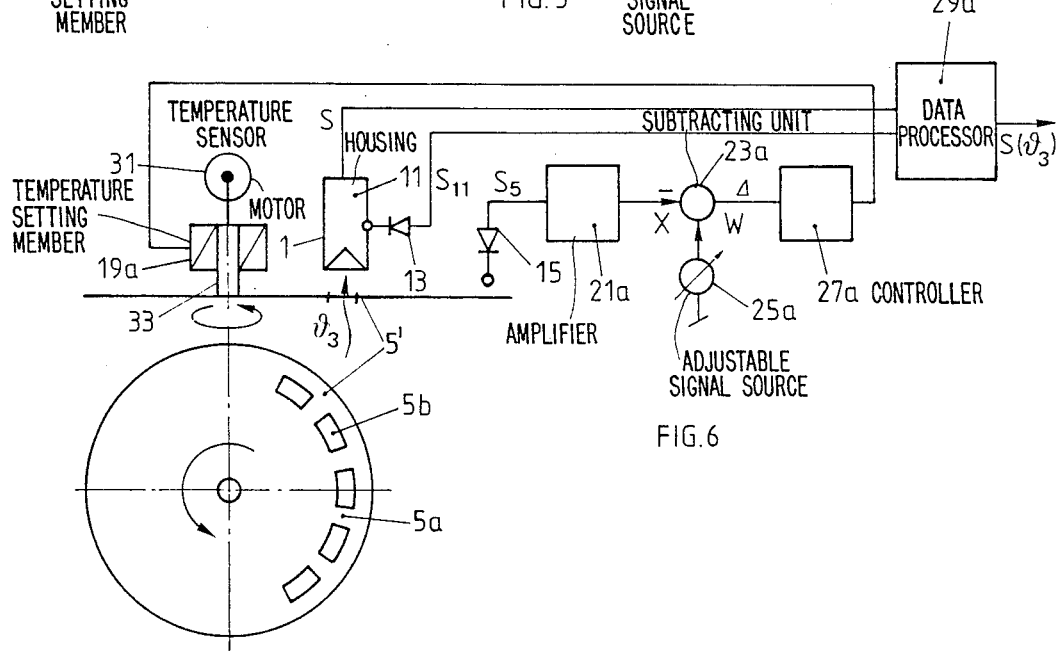
FIG. 6 is an illustration analogous to FIG. 5 but with a temperature-controlled chopper means and with a correction of the measuring signal as a function of the housing temperature of a body radiation sensor.

In the embodiment of FIG. 6, the temperature is controlled in a zone or area of the path of motion of the chopper means 5. More particularly, a chopper disc 5' including segments 5a impermeable to heat radiation and segments 5b permeable to heat radiation is usually employed and is driven by means of a motor 31 as the chopper means for obtaining high chopper frequencies not only in the illustrated embodiment but also if a mechanical chopper means is used in the remaining embodiments. In the embodiments of the present invention the output of additional temperature correctional sensor 15, measuring the temperature directly in the region of travel path of the chopper disc 5' is transmitted, optionally, after amplification and processing in a unit 21a, as the control variable signal X to a differencing or subtracting unit 23a, the second input of which, analogous to FIG. 5 is fed with a governing or desired value signal W settable at an adjustable signal source 25a, the control difference signal $\Delta$ appearing on the output side of the differencing or subtracting unit 23a is then transmitted through a controller 27a to a temperature adjusting member 19a such as, for example, a Peltier element acting on a disk shaft 33 closely thermally coupled with the chopper disk 5'. The control circuit is more inert than the circuit shown in FIG. 5 to the thermal transfer inertia between the shaft 33 and the periphery of the chopper disk 5' where, due to the high peripheral velocity, the highest ambient temperature arises so that a quick response of the control circuit is limited in order to provide stable control.

In certain applications and with a corresponding reduced dimensioning of the chopper arrangement, the last described embodiment may be optionally selected in addition to a control according to FIG. 5 especially in a situation where, for example, a Kerr cell is employed as an optoelectric chopper.

In such an arrangement and as illustrated in FIG. 6, the output $S_{11}$ of the first correctional temperature sensor 13 measuring the temperature of the sensor housing 11, is fed with the output signal S of the temperature measuring sensor 1 to an evaluating or data processing unit 29a and, at the output of the evaluating or data processing unit 29a a signal S ($\theta_3$) appears, which is representative of the body radiation.

Figure 7:
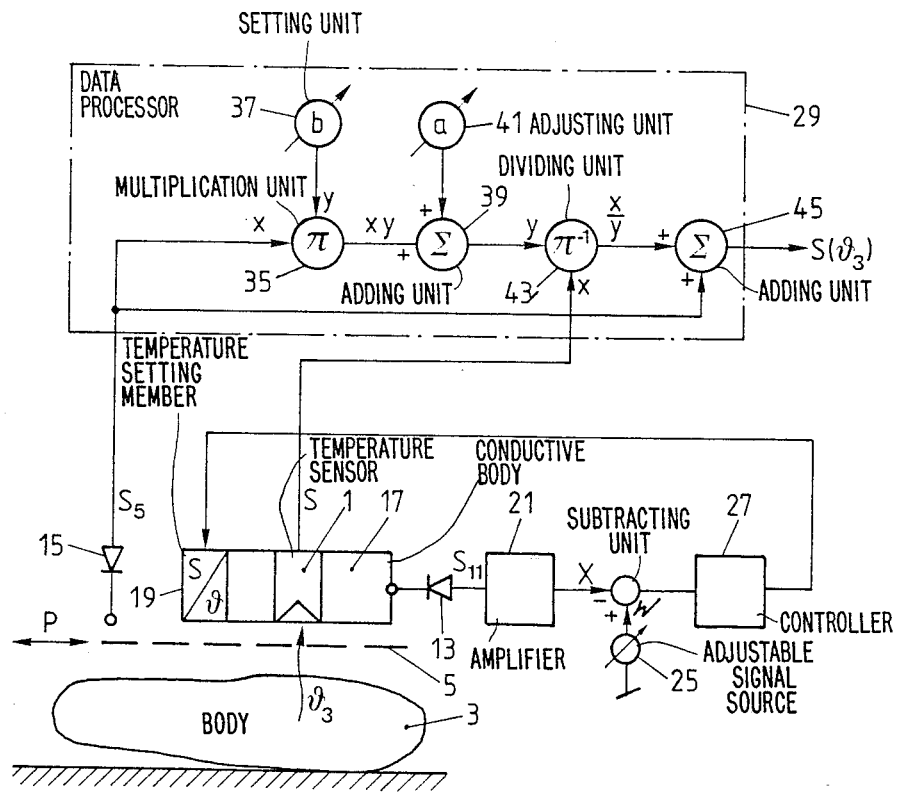
FIG. 7 is a schematic view of the arrangement of FIG. 5 provided with an evaluating unit represented by functional blocks.

The evaluating or data processing 29 is schematically illustrated in FIG. 7 and is based on the embodiment described hereinabove in accordance with FIG. 5.

The following relationship represents at least in a first approximation, of the body temperature $\theta_3$ corresponding to the body radiation:

$$\theta_3 = \frac{\theta_1}{a + b\,\theta_5} + \theta_5$$

wherein:
$\theta_3$ = a temperature prevailing at the location of the sensor 1 due to the heat radiation of the body 3,
$\theta_1$ = a temperature measured by the sensor 1, corresponding to S,
$\theta_5$ = a temperature measured by means of the sensor 15 in the immediate range of the path of motion of the chopper 5, corresponding to $S_5$,
a,b = coefficients and, respectively, constants to be empirically determined, in dependence upon the character of the body 3 as well as the arrangement of chopper means 5, temperature measuring sensor 1 and further facilities provided in the zone or area of the sensor and/or chopper means.

In accordance with the above relationship, the output signal of the additional temperature correcting sensor 15 at the evaluating or data processing unit 29 is first introduced into a multiplication unit 35 and, as a second input to the adding unit 45, the adjustable coefficient b is transmitted as the amplification factor. The coefficient b is adjusted at a setting unit 37 and stored therein. The output of the multiplication unit 35 is introduced into an adding unit 39 and, as a second input of the adding unit 39, the variable adjustable at an adjusting unit 41, is transmitted. The output of the adding unit 39 is transmitted to the denominator input of a dividing unit 43, with the numerator input of the dividing unit 43 being fed with the output signal of the temperature measuring sensor 1. Finally, the output signal of the dividing unit 43 is added in an adding unit 45 to the output signal of the additional temperature correction sensor 15, and, on the output side of the adding unit 45, an output signal $S(\theta_3)$ representing the temperature $\theta_3$ corresponding to the radiation of the body 3 is generated.

The coefficients a and in the above noted relationship, set at the evaluating or data processing unit 29, are empirically determined, for example, in such a manner that, with at least two predetermined, constant body temperatures of the body 3 at respectively two different temperatures in zone of the chopper means 5, detected by the additional temperature correction sensor 15, the output signal of the evaluating or data processing unit 29 is adjusted, by the adjustable units 37 and 41 in such a manner that the then appearing signal indicates the respective body temperature independently of the temperatures detected by the additional temperature correction sensor 15. Two differing temperatures detected by the additional temperature correction sensor 15 are produced, for example, by performing a first measurement immediately after an activation of the chopper means 5, and a respective second measurement after a thermal stabilization of the temperature detected by the additional temperature correction sensor 15.

Figure 8:
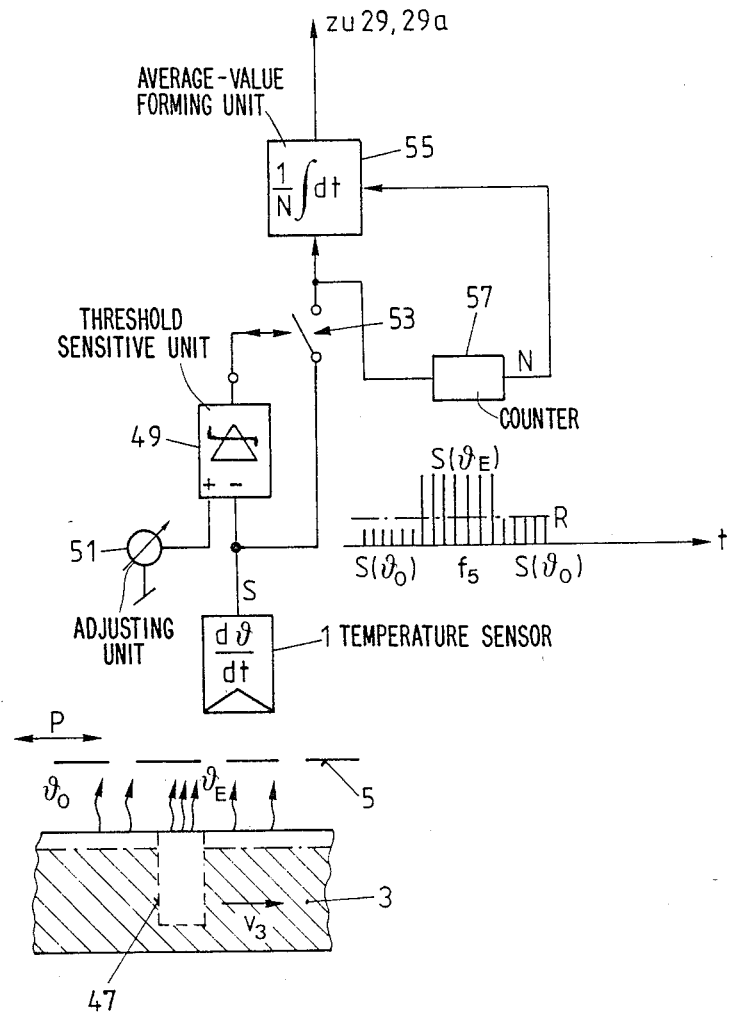
FIG. 8 is a partially schematic cross-sectional view of a body illustrating the processing units for a sensor output signal for detection of a point in time when the body to be measured, having a recess provided therein enters a measurement-relevant position and for accurate measurement of the body temperature.

A relatively accurate temperature measurement of heat radiation from a body surface, as described thus far, is, if the body 3 is not isothermal, only representative for the thermal energy content of a relatively small volume element around a part of the body 3 presently located in a zone of the temperature measuring sensor 1. However, in many applications, it would be desireable to obtain, with such a temperature measurement, an indication of the thermal energy content of a substantially larger volume element, based on the position of the body 3 with respect to the temperature measuring sensor 1. This can be achieved in a simple manner in all of the embodiments disclosed hereinabove and the method of the present invention by providing a recess in the body 3, such as, for example, a bore 47 such as illustrated in FIG. 8. The bore 47 exhibits the thermal radiation of a black body and thus is representative of a thermal energy content of a substantially larger volume element of the body 3 than in a situation wherein merely surface radiation is detected. The exploitation of this feature is of an extraordinary advantage in, for example, measuring a thermal energy condition of bodies such as cans or containers which, on the manufacturing line, are not as yet thermally equalized when they arrive at the temperature measuring point. This permits a shortening of the production line if there is no need to wait for the can or container bodies to reach an isothermal stage. In this situation, the opening in the can or container body is directly utilized as the above described recess, and the temperature is measured in a non-contact fashion in the manner described hereinabove in a zone of the opening of the can or container body.

FIG. 8 provides an example of a signal processing-/evaluation directly connected after the temperature measuring sensor 1, making it possible to detect when such a body, moved with respect to the temperature measuring sensor 1, appears in a measurement-relevant position in a range of the temperature measuring sensor 1. The body 3, moving in the direction of the arrow $V_3$ and provided with a recess 47 to determine a thermal energy content by a temperature measurement of the above noted type, emits at its surface a heat radiation corresponding to $\theta_0$, representing the thermal energy content of the surface zone as qualitatively indicated in dot-dash lines. In the zone of the recess 47, the body 3 emits the radiation corresponding to $\theta_E$ which represents the thermal energy content of a larger body volume element as qualitatively indicated by shading. By virtue of the provision of the chopper means 5, schematically illustrated in FIG. 8, the body radiation is chopped up or interrupted and impinges on the temperature measuring sensor 1. Generally, a pyroelectric detector is utilized as the temperature measuring sensor 1 which reacts to fluctuations in radiation per unit time, rather than temporally stationary radiation values. Additionally, for this reason, it is essential to provide the chopper means 5 for measuring body radiations that do not change temporally. The qualitatively illustrated pulses appear at the output of the temperature measuring sensor 1 at the chopper frequency $f_5$, with the pulses being, as soon as the recess arrives in the zone of the temperature measuring sensor 1, higher or lower than in a situation where merely the surface appears and, consequently, a radiation corresponding to $\theta_0$, is in the sensor range.

With the aid of a threshold-value-sensitive unit 49, connected after the temperature measuring sensor 1 such as, for example, a comparator with a threshold value R adjustable in an adjusting unit 51 a determination can be made since when the output pulses of the temperature measuring sensor 1 deviate from a value corresponding to the surface radiation which corresponds to $\theta_0$. Then by the threshold-value-sensitive unit 49, a sWitching element 53 is closed and the pulses occurring from that point in time on, $S(\theta_E)$, are transmitted to an av rage value-forming unit 55 which may, for example, comprise an integrating element wherein the values of the presently received pulses are added with the result being divided by the number N of received pulses detected, for example, by a counter 57. The result of he average value formed in the average value forming unit 55 is introduced in accordance with FIGS. 7, 6, or 5 to the correspondingly provided evaluating or data processing unit 29 or 29a. The chopper period, inverse to the chopper frequency $f_5$, is selected so that it is substantially shorter than the time interval, during which, at a given velocity $V_3$ of the body 3, the recess 47 is present in a range of the temperature measuring sensor 1. By the average value formation in the average value forming unit 55, incidental fluctuations of the pulses corresponding to $S(\theta_E)$ are averaged. Moreover, the threshold-value-sensitive unit 49 makes it possible to switch the arrangement of the present invention to an active measuring mode by way of a switch 53 at the exact instant when the body 3 is in a measurement-relevant position.

By virtue of the above described method and arrangement or apparatus of the present invention, it is possible to accurately measure, in a non-contact fashion, the temperature corresponding to the thermal radiation of a body 3, and to utilize this exact temperature measurement for measuring the thermal energy content of a large body volume element by the provision of a recess in the body 3. Accordingly, the method and arrangement of the present invention make it feasible to obtain, for example, in connection with hollow members that are not isothermal, such as cans or containers on a production line, with the use of a single temperature measurement, a representative value for their thermal energy content. This is important in, for example, testing such can or container bodies for leaks or pressure drops relative to leakages must be separated from pressure drops caused by temperature or, in other words, where a temperature compensation of the pressure relevant at the point for measurement must be performed.

While I have shown and described several embodiments in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope o the appended claims.

I claim:

1. A measuring apparatus for a non-contact measurement of a temperature of a body, the apparatus comprising:
   a first temperature sensor means for measuring a temperature of heat radiation received from a direction toward said body;
   a heat radiation chopper means disposed in front of a heat input region of the first temperature sensor means for chopping heat radiation;
   at least one second temperature sensor means arranged adjacent at least one of the chopper means;
   a multiplication unit connected after an output of the at least one second temperature sensor means wherein, a signal of an adjustable value signal is fed to the second input of the multiplication unit, an output of the multiplication unit is fed to a summation unit, an adjustable value signal is fed as a second input to said summation unit, an output of the first temperature sensor means is transmitted to a numerator input of a dividing unit, a denominator input of the dividing unit is fed with an output signal of the summation unit; and
   wherein an output of the dividing unit as well as an output from the second temperature sensor means are transmitted to a summation unit, and an output of which represents the temperature of the body.

2. A measuring apparatus according to claim 1, further comprising:
   storage means for storing said adjustable value signals, said storage means being connected to said inputs of said multiplication unit and said summation unit respectively.

3. An apparatus according to claim 1, wherein:
   at least one further temperature sensor means is closely thermally coupled with a housing means for housing said first temperature sensor means.

4. An apparatus according to claim 3, wherein:
   said further temperature sensor means is connected as a controlled variable pick-up to a temperature feedback control circuit means for providing a controlled temperature of said housing means.

5. An apparatus according to claim 1, wherein:
   said second temperature sensor means is closely thermally coupled with said chopper means.

6. An apparatus according to claim 1, wherein;
   said chopper means id mechanically moving; and
   wherein said second temperature sensor means is arranged in an area along a path of motion of said chopper means.

7. An apparatus according to claim 1, further comprising:
   storage means for storing at least one of two predetermined value signals.

8. An apparatus according to claim 1, wherein:
   at least one of said first and second temperature sensor means includes time averaging means; and
   wherein an average time is longer than a chopper period of said chopper means.

9. An apparatus according to claim 1, wherein:
   at least said first temperature sensor means is a pyroelectrical thermal sensor.

10. An apparatus according to claim 1, further comprising:
    threshold value sensitive means, connected at an output of said first temperature sensor means, for providing an output operatively connecting said output of said first temperature sensor means to said numerator input of said dividing unit when said output signal of said first temperature sensor means crosses a threshold value.

11. An apparatus according to claim 10, wherein:
    said threshold value sensitive means responds to a predetermined change of heat radiation per unit of time as detected by said first temperature sensor means due to said chopper means.

12. An apparatus according to claim 1, wherein: said first temperature sensor means senses changes in heat radiation per unit of time.

13. An apparatus according to claim 1, wherein said at least one second temperature sensor means is arranged on the side of said chopper means facing said first temperature sensor means.

14. A method for a non-contact measurement of a temperature of a body, the method comprising the steps of:
   interrupting a heat radiation between the body and a temperature sensor means by a chopper means;
   detecting at least one ambient temperature;
   multiplying a first signal dependent on said ambient temperature by a first coefficient;
   adding a result of the multiplication to a second coefficient to obtain a second signal;
   detecting a third signal dependent upon the temperature detected by the sensor means and dividing the same by the second signal in order to obtain a fourth signal; and
   adding the fourth signal to the first signal to obtain a signal representing a temperature of the body.

15. A method according to claim 14, further comprising the step of:
   averaging an output signal from the sensor means over a plurality of periods of interruption by the chopper means 16. A method according to claim 14, further comprising the step of:
   empirically determining the first and second coefficients from at least two measurements at predetermined body temperatures and at two values of a temperature measured in a zone of the chopper means, and storing said first and second coefficient.

17. A method according to claim 14, further comprising the step of:
   detecting a temperature of a housing means accommodating said temperature sensor means.

18. A method according to claim 17, further comprising the step of:
   controlling said temperature of said housing means to a predetermined value.

19. A method according to claim 14, wherein the step of:
   detecting at least one ambient temperature includes a step of detecting an ambient temperature influenced by heat generated by operation of said chopper means.

20. A method according to claim 14, further comprising the steps of:
   mechanically moving said chopper means to interrupt the heat radiation; and
   wherein the step of detecting at least one ambient temperature includes a step of detecting a temperature in vicinity of a travel path of said chopper means.

21. A method according to claim 14 further comprising the step of:
   providing said body with a recess and placing said body with said recess facing said temperature sensor means.

22. A method according to claim 14, further comprising the steps of:
   providing said body with a recess and moving said body with said recess relative to said sensor means; and
   choosing a chopper period of said chopper means less than a time-span during which said recess lies within a measuring range of said sensor means.

23. A method according to claim 22, further comprising the steps of:
   monitoring an output signal of said temperature sensor means for occurrence of a predetermined threshhold value, which indicates appearance of said recess within said measuring range; and
   using said output signal as said third signal when said predetermined characteristic occurs.

24. A method according to claim 23, wherein:
   said predetermined characteristic is a predetermined jump in amplitude of impulses on said output signal, due to said chopper means.

25. A method according to claim 14, wherein:
   a time derivative of heat radiation is detected by said temperature sensor means.

26. The method according to claim 14, wherein said at least one second temperature sensor means is arranged on a side of said chopper means facing said first temperature sensor mean.

27. The method according to claim 14, wherein said first temperature sensor means senses heat radiation.

* * * * *